UNITED STATES PATENT OFFICE 2,048,263

HIGHLY REFRACTORY MASS PRODUCED BY MELTING

Ture Robert Haglund, Stockholm, Sweden

No Drawing. Application August 5, 1932, Serial No. 627,679. In Germany August 22, 1931

1 Claim. (Cl. 13—36)

This invention relates to highly refractory masses produced by fusion and which, after solidification, contain as chief constituent magnesia spinel crystals and to a process for the manufacturing of the same.

It has been found that in masses of this kind the presence of compounds having lower melting points than the spinel compounds, such as silicates, titanates or aluminates play an important part and by predetermined formation of silicates, titanates and aluminates in the mixture, in which on the one hand basic spinel forming oxides, such as MgO, and on the other hand acid spinel forming oxides, such as $Al_2O_3$, are utilized as spinel formers, the refractoriness of the resulting product can be very greatly influenced.

It is the object of the present invention to produce a highly refractory composition which after solidification contains at least 50% by weight of magnesia spinel crystals and at the same time contains at least 8% of compounds having a lower melting point, for example, silicates, titanates or aluminates. It is of further importance that the magnesium oxide and calcium oxide content of these lower melting point compounds must be either very small or in excess of 45%.

It is therefore important and essential that silicic acid or constituents forming aluminate are present and that at the same time oxides for the saturation of the silicic acid are available. It is however further important and essential that as regards the oxides for the saturation or formation of the compounds having lower melting points, the contents in magnesia and calcium oxide is regulated in a predetermined manner so as to be present either in a small quantity 0 to 20% and more preferably 0 to 15% or in a quantity exceeding 45%.

The magnesium oxide and calcium oxide content of compounds having lower melting points should preferably be 45 to 80%, the magnesium oxide content should preferably amount to either 50 to 70% or below 10%. If the MgO and CaO content of the compounds having a lower melting point is small, that is, for instance, below 20%, it is advisable to take high $Al_2O_3$ contents of the compounds having lower melting points.

The quantity of the compounds having lower melting points employed in the mass may vary within wide limits. It depends essentially on the properties of these compounds. The higher the melting point of these compounds, the greater can be the quantity thereof present in the mass. The total content in compounds having lower melting points must however preferably be less than 40% and the content of the mass in silicic acid at a maximum 11%.

The silicate quantity of the mass must remain within certain limits, and for this reason the limitation of the silicic acid content given above is advisable. The manufacturing of the novel mass is effected by melting, preferably in the electric furnace, as higher temperatures are necessary for the melting. A mixture of ore and fluxes is inserted into the furnace, said mixture containing as chief constituent spinel forming oxides, at the same time constituents which are capable of forming the compounds having low melting points, such as, silicates, titanates and aluminates are charged into the furnace. The oxides contained in the initial substance have to be considered when the mixture is regulated so that on the one hand the formation of spinels MgO $Al_2O_3$ is possible simultaneously with the formation of lower melting point combinations of the type indicated.

It is material that, if only very small quantities of silicic acid are employed, a too great reduction of the silicate quantity of the mass is avoided, which also has certain disadvantages. If the mass contains too little of one of the lower melting point combinations, it may happen that bodies which are cast from such spinel masses have a strong tendency to burst as spinel masses poor in silicate solidify rapidly owing to their very high refractoriness and the bodies thus produced retain a high internal tension. The lower limit of the content in lower melting point combinations has therefore to be adjusted to a minimum of 8%. The silicic acid and titanic acid content of the mass is preferably adjusted to more than 2.75%.

The silicates or aluminates, the formation of which is intended according to the invention, possess ordinarily a relatively high melting point, owing to the special regulation as regards their content in MgO and CaO. Within this range certain variations are however still possible. Silicic acid combinations of especially high melting point are obtained if the masses are regulated so that the oxide saturating the silicic acid is present in a multiple mol. relation compared with the silicic acid or at least in strong excess. Other silicic acid combinations possess less high refractoriness.

The total alumina content of the mass is preferably to be adjusted so as not to be present in an amount greater than that theoretically necessary to form 100% of spinel.

The following is an example of composition:

| | Percent |
|---|---|
| MgO | 33 |
| $Al_2O_3$ | 61 |
| $SiO_2$ | 6 |

In the mass are 83.5% spinel and 16.5% silicate.

For part of the alumina other spinel forming sesquioxides may be substituted, for instance chromium oxide or vanadium oxide and the like. In a restricted limit other oxides, for instance FeO, MnO, BeO and the like may be substituted for magnesia. A substitution of the alumina by chromium oxide has to be selected especially if the mass has to have a more neutral character, whereas for the obtention of a mass of very basic character alumina alone is preferred, and in this case especially magnesia excess has to be employed. The $Cr_2O_3$ contents must generally not exceed 10%. The average melting point for the mass of the lower melting point combination can be easily regulated to a temperature of 1800° C. to 2000° C. By regulating the quantity and the melting point of the lower melting point combinations it is further possible to influence to a certain extent the crystallization of the spinels or oxides, possessing a high melting point.

Preferably only such quantities of lower melting point combinations are used that no accumulations of the lower melting point combinations are formed. As a rule this is attained by employment of a silicic acid content of about 3 to 7%.

If lime or titanium or manganese or iron or mixtures of two or all these substances are used, the total content of these impurities must be restricted to a maximum of 7 to 8% of the mass.

According to the invention the chief object is, to produce stones by casting the molten mass. The use of lower melting point compounds makes it possible to overcome by tempering the disadvantages which otherwise are connected with cast, highly refractory masses and which are especially due to the existence of internal tensions in the molded body. It is therefore advisable to carry through the tempering treatment in such a manner that the cast molded bodies are maintained during at least 5 hours at a temperature of 1000 to 1500° C. By this tempering treatment an interengaging crystal structure is imparted to the bodies and they are practically free from tension.

It is further advisable to cast the refractory masses into bodies of as large size as possible, for example, bodies which weigh at least 25 kgs. The weight of the cast bodies may for instance amount to 50 to 100 kgs.

Although the production of refractory building elements by way of casting of the molten mass is the most advisable manner of production, the production of building elements by way of disintegration of the cooled molten mass, is also possible. The molten mass is for instance granulated, and molded bodies are produced with the aid of bonding material from the granulated mass, for instance by pressing and then, as usual for refractory purposes, burned. As a bonding material, chromite or magnesite is preferably selected, whereas clay has to be excluded as far as possible unless the mass shows only silicates poor in magnesia.

No special bonding material need be used. In the masses according to the invention the mass of the lower melting point combinations acts as binding material at the temperatures to be applied when burning, and it is even possible to produce molded bodies by sole employment of substances having a sticking effect, volatilizing from the granulated mass during the burning, this mass containing eventually also the finest ground molten material, these molded bodies being subsequently burned. Small quantities of such substances can be added, if desired, which lower the softening point of the silicates or of the lower melting point combinations.

Whereas in all known processes for the production of spinels in the melting process the employment of the purest possible substances was a supposition, this invention presents the advantage of utilizing without further preparation or purifying the raw materials found in nature which are always polluted more or less by foreign bodies. If the content in iron is too much, iron and similar impurities can be removed in the melting process, by reducing the iron compounds to molten iron and separately withdrawing the molten iron and the molten refractory. Although, according to the invention, it is possible to start from impure or non-purified raw materials, the process supplies refractory masses which, as regards properties, are equal to the best quality known highly refractory products or even superior to same.

I claim:

Highly refractory mass produced by fusion of its constituents and having greater strength than pure spinel consisting of 17 to 49% MgO, 43 to 71.35% $Al_2O_3$, 2.75 to 11% $SiO_2$, and 0 to 8% of impurities consisting of the group CaO, $TiO_2$, MnO, and FeO, the said constituents being so related in the mass that the mass consists of 60 to 92% $MgO.Al_2O_3$ spinel for providing the high refractoriness of the mass, and 40 to 8% of other basically saturated combinations of acid and basic oxides having melting points lower than the $MgO.Al_2O_3$ spinel but over 1800° C. and wherein the MgO and CaO content of said other basically saturated combinations is between 1 to 20% and 45 to 80% and not between 21% and 44% for providing the strength of the mass.

TURE ROBERT HAGLUND.